(12) United States Patent
Shigeta

(10) Patent No.: US 9,387,879 B2
(45) Date of Patent: Jul. 12, 2016

(54) ELECTRIC POWER STEERING APPARATUS

(71) Applicant: NSK LTD., Tokyo (JP)

(72) Inventor: Taishi Shigeta, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/409,721

(22) PCT Filed: Jun. 9, 2014

(86) PCT No.: PCT/JP2014/065268
§ 371 (c)(1),
(2) Date: Dec. 19, 2014

(87) PCT Pub. No.: WO2014/199959
PCT Pub. Date: Dec. 18, 2014

(65) Prior Publication Data
US 2015/0175198 A1    Jun. 25, 2015

(30) Foreign Application Priority Data

Jun. 10, 2013 (JP) ................................. 2013-121876

(51) Int. Cl.
*B62D 6/10* (2006.01)
*G01L 5/22* (2006.01)
(Continued)

(52) U.S. Cl.
CPC ................ *B62D 6/10* (2013.01); *B62D 5/0409* (2013.01); *G01L 3/10* (2013.01); *G01L 3/105* (2013.01); *G01L 5/221* (2013.01)

(58) Field of Classification Search
CPC .......... B62D 6/10; B62D 5/0409; G01L 3/10; G01L 3/105; G01L 5/221

USPC .......................................................... 180/444
See application file for complete search history.

(56) References Cited

U.S. PATENT DOCUMENTS 5,578,767 A * 11/1996 Chikaraishi et al. ..... 73/862.331
5,739,616 A *  4/1998 Chikaraishi et al. .......... 310/194
(Continued)

FOREIGN PATENT DOCUMENTS

JP      08-043662 A    2/1996
JP    2000190857 A    7/2000
(Continued)

OTHER PUBLICATIONS

International Search Report (PCT/ISA/210) issued Sep. 9, 2014, in related International Application No. PCT/JP2014/065268.

*Primary Examiner* — Anne Marie Boehler
*Assistant Examiner* — Michael Stabley
(74) *Attorney, Agent, or Firm* — Sughrue Mion, PLLC

(57) ABSTRACT

An electric power steering apparatus includes an input shaft to which steering force from a steering wheel is applied, an output shaft to which assisting force generated by an electric motor is applied, and a torque detection sleeve. One of the input shaft and the output shaft includes a cylindrical portion having a female stopper portion and a circumferential groove. The other of the input shaft and the output shaft has a male stopper portion being in concave-convex engagement with the female stopper portion and relatively rotatable in a given angular range. An edge of a base end portion of the torque detection sleeve is clinched to the circumferential groove. The circumferential groove is provided on a portion of an outer peripheral surface of the cylindrical portion radially overlapping a stopper engagement region in which the female stopper portion and the male stopper portion are engaged with each other.

5 Claims, 12 Drawing Sheets

(51) Int. Cl.
   *G01L 3/10*   (2006.01)
   *B62D 5/04*   (2006.01)

(56) References Cited

U.S. PATENT DOCUMENTS

| | | | |
|---|---|---|---|
| 6,370,966 B1* | 4/2002 | Naruse et al. | 73/862.08 |
| 7,284,635 B2* | 10/2007 | Chikaraishi | 180/444 |
| 7,814,803 B2* | 10/2010 | Akiyama et al. | 73/862.333 |
| 2007/0209864 A1* | 9/2007 | Segawa et al. | 180/446 |
| 2011/0284312 A1* | 11/2011 | Aizawa et al. | 180/443 |
| 2014/0190762 A1* | 7/2014 | Kiyota et al. | 180/444 |

FOREIGN PATENT DOCUMENTS

| | | |
|---|---|---|
| JP | 2002364793 A | 12/2002 |
| JP | 2005121507 A | 5/2005 |
| JP | 2007224946 A | 9/2007 |
| JP | 2009190670 A | 8/2009 |
| WO | 03104065 A1 | 12/2003 |

* cited by examiner

ELECTRIC POWER STEERING APPARATUS

TECHNICAL FIELD

The present invention relates to an electric power steering apparatus being configured so that the force required for the driver to operate the steering wheel can be reduced by using an electric motor as assisting force generation source.

BACKGROUND ART

The steering apparatus for an automobile is configured as shown in FIG. 10 so that the rotation of a steering wheel 1 is transmitted to the input shaft 3 of a steering gear unit 2 and a pair of left and right tie rods 4, 4 is pushed and pulled with the rotation of the input shaft 3, thereby giving a steering angle to the front wheels. The steering wheel 1 is supported and fixed to the rear end portion of a steering shaft 5, and in a state in which the steering shaft 5 is inserted into the cylindrical steering column 6 supported on the vehicle body in the axial direction, the steering shaft 5 is rotatably supported on the steering column 6. The front end portion of the steering shaft 5 is connected to the rear end portion of an intermediate shaft 8 via a universal joint 7, and the front end portion of the intermediate shaft 8 is connected to the input shaft 3 via another universal joint 9. The example shown in the figure is an electric power steering apparatus being configured to reduce the force required to operate the steering wheel 1 by using an electric motor 10 as assisting force generation source. The front-rear direction stated in this description and all the claims thereof refers to the front-rear direction of a vehicle, unless otherwise specified.

FIGS. 11 and 12 show the electric power steering apparatus described in Patent Document 1 as an example of a more specific structure of an electric power steering apparatus. A steering column 6a is formed of a combination of an inner column 11 and an outer column 12 so that the entire length thereof can be shrunk at the time of a secondary collision, and the steering column 6a is supported on the vehicle body. The steering shaft 5a rotatably supported inside the steering column 6a is formed of a combination of a lower shaft 13 and an upper shaft 14 so that torque can be transmitted and so that the entire length thereof can be shrunk at the time of the secondary collision. The steering wheel 1 (see FIG. 10) is fixed to the rear end portion of the upper shaft 14 protruding from the rear end opening of the outer column 12. A housing 15 is securely connected to the front end portion of the inner column 11, and the front half section of the lower shaft 13 is inserted into the inside of the housing 15. An output shaft 16 is rotatably supported by a pair of ball bearings 17 and 18 on the front side of the lower shaft 13 serving as an input shaft. The output shaft 16 is connected to the lower shaft 13 via a torsion bar 19. The universal joint 7 (see FIG. 10) is connected to the front end portion of the output shaft 16 protruding from the front end opening of the housing 15.

A cylindrical portion 20 is provided at the rear end portion of the output shaft 16. A circumferential groove 21 is provided on the outer peripheral surface of the cylindrical portion 20 around the entire circumference in the circumferential direction. In contrast, on the inner peripheral surface of the cylindrical portion 20, a female stopper portion 22 having a concave-convex shape along the circumferential direction is provided. On the other hand, at the front end portion of the outer peripheral surface of the lower shaft 13, a male stopper portion 23 having a concave-convex shape along the circumferential direction is provided, the outer diameter dimension (the diameter of the circumscribed circle) thereof being smaller than that of the portion near the front end thereof. The male stopper portion 23 and the female stopper portion 22 are in concave-convex engagement with each other so as to be relatively rotatable in a given angular range (for example, ±5 degrees from a neutral state in which the torsion bar 19 is not twisted). Hence, the torsion bar 19 is prevented from being twisted excessively. In the case of the structure shown in the figure, the circumferential groove 21 provided on the outer peripheral surface of the cylindrical portion 20 is disposed on the front side of a stopper engagement region in the axial direction in which the female stopper portion 22 and the male stopper portion 23 are engaged with each other.

The lower shaft 13 is made of steel, a magnetic metal, and a torque detection concave-convex portion 24 having a concave-convex shape along the circumferential direction is provided at the portion near the front end of the outer peripheral surface of the lower shaft 13. A torque detection sleeve 25 made of a non-magnetic metal having electrical conductivity, such as an aluminum alloy, and having a cylindrical shape is disposed radially outside the torque detection concave-convex portion 24. The base end portion of the torque detection sleeve 25 is securely fitted on the cylindrical portion 20. In this state, the edge portion of the base end portion of the torque detection sleeve 25 is clinched to the circumferential groove 21 to position the torque detection sleeve 25 and to prevent the displacement thereof in the axial direction. A plurality of window holes 26, 26 are provided at the portions of the torque detection sleeve 25 positioned radially outside the torque detection concave-convex portion 24. A torque detection coil unit 27 is securely fitted in the housing 15 and is disposed radially outside the torque detection concave-convex portion 24 and the torque detection sleeve 25.

A worm wheel 28 is securely fitted on the portion near the rear end of the output shaft 16. A worm 29 rotatably supported inside the housing 15 is engaged with the worm wheel 28. The electric motor 10 (see FIG. 10) is supported by and fixed to the housing 15, and the output shaft of the electric motor 10 is connected to the base end portion of the worm 29 so that torque can be transmitted.

In the case of the electric power steering apparatus configured as described above, when torque serving as a steering force is applied to the steering shaft 5a by the operation of the steering wheel 1 by the driver, the torsion bar 19 is elastically twisted (in the given angular range) by the amount corresponding to the direction and magnitude of this torque. Accordingly, the positional relationship between the torque detection concave-convex portion 24 and the torque detection sleeve 25 in the circumferential direction is changed, whereby the impedances of the coils of the torque detection coil unit 27 are changed. Hence, on the basis of the changes in impedance, the direction and magnitude of the torque can be detected. The electric motor generates assisting force depending on the detection result of the torque. This assisting force is increased by a worm reducer 30 in which the worm 29 is engaged with the worm wheel 28 and then applied to the output shaft 16. As a result, the force required for the driver to operate the steering wheel 1 is reduced.

On the other hand, when the twisted amount of the torsion bar 19 reaches the upper limit value on one side or on the other side of the given angular range due to the input of large torque from the steering wheel 1 to the steering shaft 5a, the female stopper portion 22 is engaged with the male stopper portion 23 in the circumferential direction. Hence, on the basis of this engagement, part of the torque is directly transmitted from the lower shaft 13 to the output shaft 16. At this time, the cylindrical portion 20 is liable to be twisted as the torque is transmitted.

The torsion rigidity of the cylindrical portion 20 at the axial position where the circumferential groove 21 is provided is made lower than that at the other axial position. The reason for this is that the thickness of the cylindrical portion 20 is made smaller by the depth amount of the circumferential groove 21 at the axial position where the circumferential groove 21 is formed. On the other hand, the portion of the cylindrical portion 20 radially overlapping the stopper engagement region in which the female stopper portion 22 and the male stopper portion 23 are engaged with each other is twisted integrally with the front end portion of the lower shaft 13 on which the male stopper portion 23 is formed, at the time of the above-mentioned torque transmission. Hence, at this time, the front end portion of the lower shaft 13 serves as a reinforcement member, whereby the torsion rigidity of the portion of the cylindrical portion 20 radially overlapping the stopper engagement region in which the female stopper portion 22 and the male stopper portion 23 are engaged with each other is improved. However, in the case of the above-mentioned conventional structure, the circumferential groove 21 is not radially overlapping the stopper engagement region in which the female stopper portion 22 and the male stopper portion 23 are engaged with each other. For this reason, the torsion rigidity of the portion of the cylindrical portion 20 provided with the circumferential groove 21 on the outer peripheral surface thereof is not improved particularly at the time of the above-mentioned torque transmission. Hence, in the case of the above-mentioned conventional structure, the thickness of the cylindrical portion 20 is required to be made large to some extent to secure torsion rigidity at the portion of the cylindrical portion 20 provided with the circumferential groove 21 on the outer peripheral surface thereof. As a result, when the respective components for torque detection and the peripheral portions thereof are made smaller in diameter and lighter in weight, it is difficult to make the cylindrical portion 20 smaller in thickness.

PRIOR ART DOCUMENT

Patent Document

Patent Document 1: WO 2003/104065A1

SUMMARY OF INVENTION

Problem to be Solved by Invention

It is an object of the present invention to provide a structure that makes it easier to reduce a thickness of a cylindrical portion on which a base end portion of a torque detection sleeve is securely fitted.

Means for Solving the Problem

According to an aspect of the present invention, an electric power steering apparatus includes an input shaft to which the steering force from a steering wheel is applied, an output shaft to which the assisting force generated by an electric motor is applied, a torsion bar provided radially inside the input shaft and the output shaft in a state in which the input shaft and the output shaft are coaxially connected to each other, and a torque detection sleeve. One of the input shaft and the output shaft has a cylindrical portion, the cylindrical portion being provided at an end section of the one of the input shaft and the output shaft that is connected to the other of the input shaft and the output shaft. The cylindrical portion includes a female stopper portion having a concave-convex shape along the circumferential direction and provided on an inner peripheral surface of the cylindrical portion, and a circumferential groove provided along the circumferential direction on an outer peripheral surface of the cylindrical portion. The other of the input shaft and the output shaft includes a male stopper portion having a concave-convex shape along the circumferential direction and provided on an outer peripheral surface of an end section of the other of the input shaft and the output shaft that is connected to the one of the input shaft and the output shaft, the male stopper portion being in concave-convex engagement with the female stopper portion so as to be relatively rotatable in a given angular range, and a torque detection concave-convex portion having a concave-convex shape along the circumferential direction and provided on a portion of an outer peripheral surface of the other of the input shaft and the output shaft that is adjacent to the male stopper portion in the axial direction. The torque detection sleeve is disposed radially outside the torque detection concave-convex portion. A base end portion of the torque detection sleeve is securely fitted on the cylindrical portion in a state in which an edge portion of the base end portion is clinched to the circumferential groove. The circumferential groove is provided on a portion of the outer peripheral surface of the cylindrical portion radially overlapping the stopper engagement region in which the female stopper portion and the male stopper portion are engaged with each other.

A radial engagement amount between the female stopper portion and the male stopper portion (a radial engagement height or meshing amount when the female stopper portion and the male stopper portion are engaged with each other along the circumferential direction) may decrease from a distal end toward a base end of the cylindrical portion. For example, in the stopper engagement region, the diameter of the inscribed circle of the female stopper portion may be constant along the axial direction, and the diameter of the circumscribed circle of the male stopper portion may decrease along the axial direction from the distal end toward the base end of the cylindrical portion (from the base end toward the distal end of the male stopper portion).

An auxiliary circumferential groove may be provided along the circumferential direction on the portion on the outer peripheral surface of the cylindrical portion radially overlapping the stopper engagement region and at a location between the circumferential groove and the distal end of the cylindrical portion, and a portion of the base end portion of the torque detection sleeve may be clinched to the auxiliary circumferential groove. A plurality of auxiliary circumferential grooves may be provided in the axial direction.

The electric power steering apparatus may include a steering column, a steering shaft and a housing. The steering column has an inner column and an outer column, and a front portion of the outer column is fitted onto a rear portion of the inner column so as to allow a relative displacement in the axial direction. The steering shaft has the input shaft and an upper shaft, and a front portion of the upper shaft is fitted to a rear portion of the input shaft (lower shaft) so as to allow a torque transmission and a relative displacement in the axial direction. The steering shaft is rotatably supported inside the steering column, and the steering wheel is fixed to the rear end portion of the upper shaft protruding from the rear end opening of the steering column. The housing rotatably supports the output shaft inside the housing in a state in which the housing is securely connected to the front end portion of the inner column. The end section of the input shaft and the end section and the intermediate section of the output shaft are disposed inside the housing. The one of the input shaft and the output shaft is the input shaft, and the other of the input shaft and the output shaft is the output shaft.

With this configuration, for example, a seal ring (a seal ring for preventing the lubricant inside the housing from leaking into the space radially inside the steering column) may be securely fitted on the rear end portion serving as the base end portion of the torque detection sleeve, and the distal end of the seal ring may be made in slide contact with the step surface on the inner face of the housing opposed to the rear end portion of the seal ring in the axial direction.

Advantage of the Invention

With the electric power steering apparatus according to the present invention configured as described above, the portion of the cylindrical portion provided with the circumferential groove on the outer peripheral surface thereof radially overlaps the stopper engagement region in which the female stopper portion and the male stopper portion are engaged with each other. Hence, when part of torque is directly transmitted between the input shaft and the output shaft via the stopper engagement region in which the female stopper portion and the male stopper portion are engaged with each other, one end section of the other rotation shaft (the input shaft or the output shaft) provided with the male stopper portion serves as a reinforcement member, whereby the torsion rigidity of the portion of the cylindrical portion provided with the circumferential groove on the outer peripheral surface thereof can be improved. Therefore, when the respective components for torque detection and the peripheral portions thereof are made smaller in diameter and lighter in weight, the cylindrical portion can easily be made smaller in thickness by the amount of the improvement.

With the radial engagement amount between the female stopper portion and the male stopper portion being decreased from the distal end toward the base end side of the cylindrical portion, when part of the torque is directly transmitted between the input shaft and the output shaft via the stopper engagement region, the stress distribution at the portion of the cylindrical portion provided with the circumferential groove on the outer peripheral surface thereof is suppressed lower than the stress distribution at the portion further near the distal end. Therefore, when the respective components for torque detection and the peripheral portions thereof are made smaller in diameter and lighter in weight, the cylindrical portion can easily be made smaller in thickness by the amount of the suppression.

When the auxiliary circumferential groove is provided, the strength of the connection of the base end portion of the torque detection sleeve to the cylindrical portion is enhanced.

EMBODIMENTS OF INVENTION

Figure 10:
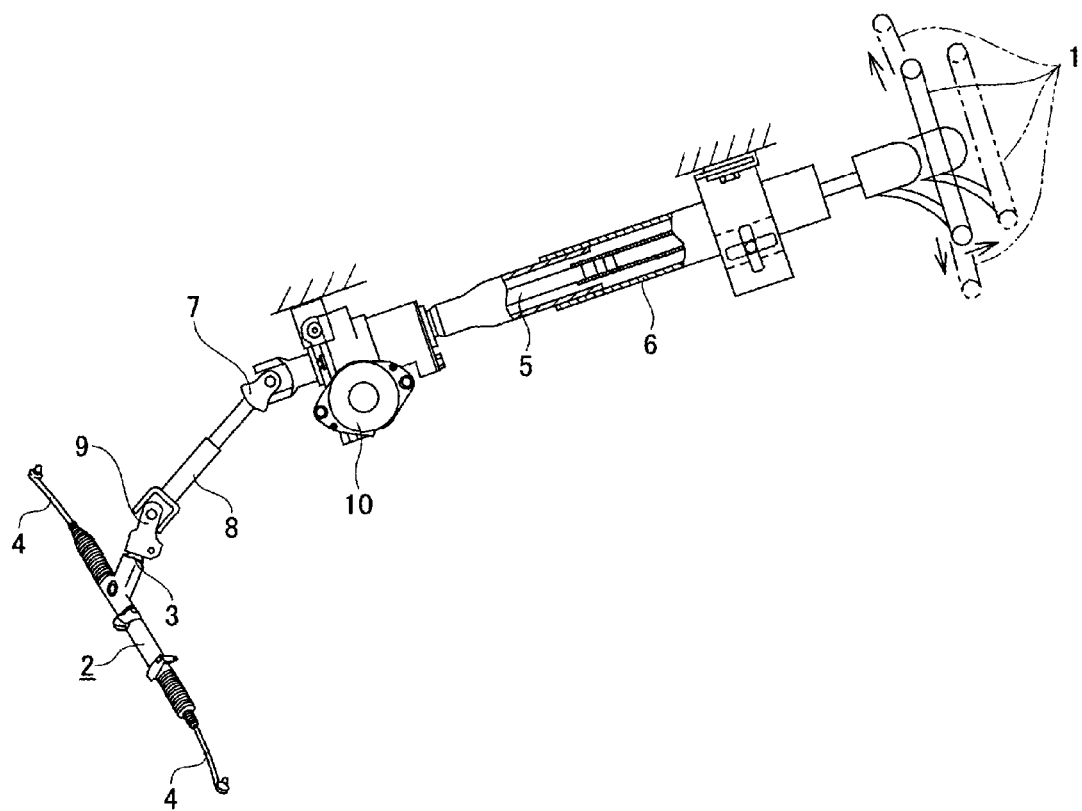
FIG. 10 is a partially cut-away side view of a power steering apparatus according to a conventional example.
Figure 11:
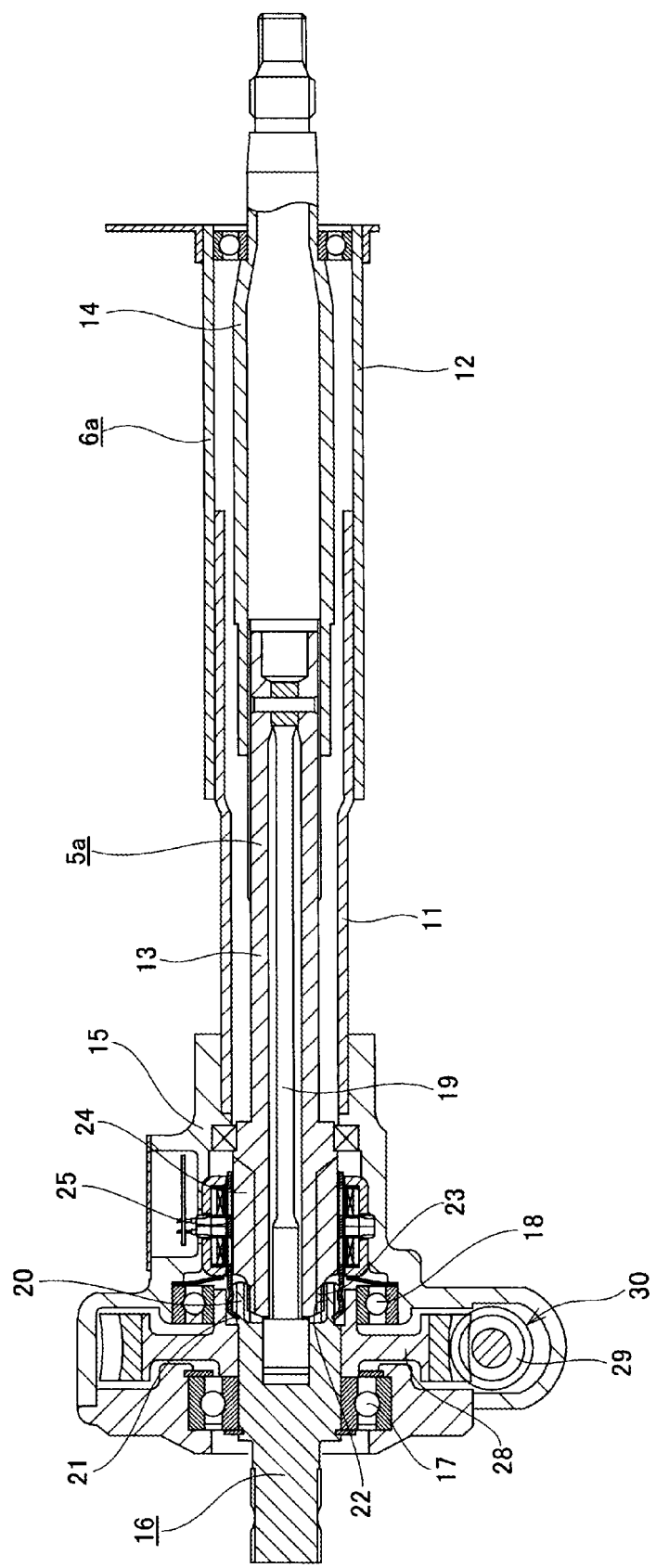
FIG. 11 is a sectional view of an electric power steering apparatus according to a conventional example.
Figure 12:
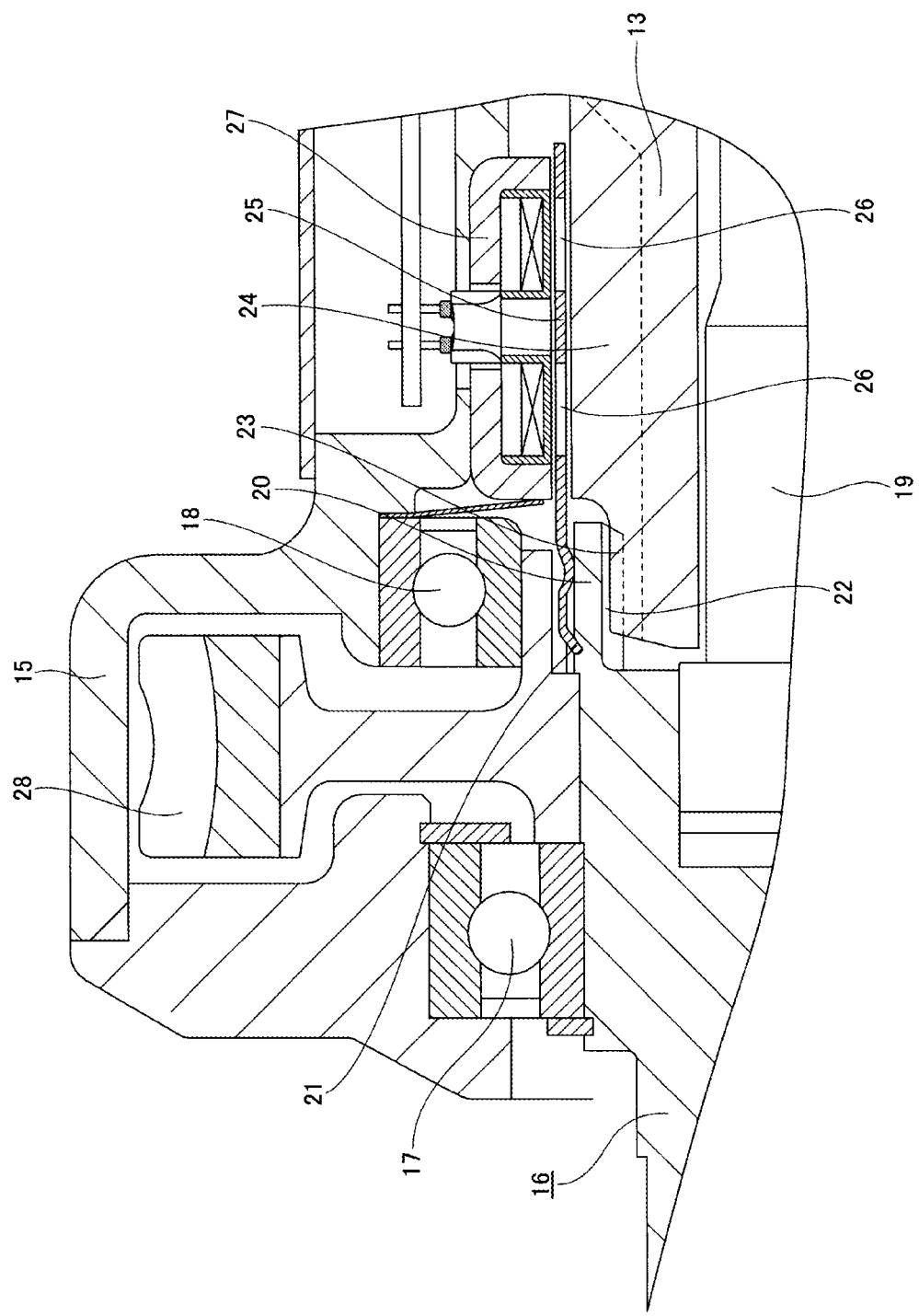
FIG. 12 is an enlarged view of the left upper half section of FIG. 11.

A first embodiment according to the present invention will be described with reference to FIGS. 1 to 7. An electric power steering apparatus according to this embodiment includes a steering column 6b, a steering shaft 5b, a housing 15a, an output shaft 16a, a torsion bar 19a, a torque detection sleeve 25a, a torque detection coil unit 27a, a board 44, an electric motor 10 (see FIG. 10), and a worm reducer 30a.

The steering column 6b includes a cylindrical inner column 11a disposed on the front side and an outer column 12a disposed on the rear side. The inner column 11a and the outer column 12a are combined so as to be extendable and are supported on the vehicle body by a support bracket 31. The inner and outer columns 11a, 12a are made of steel or a light metal, such as an aluminum alloy.

The steering shaft 5b, in which an upper shaft 14a having a hollow shaft shape and disposed on the rear side is spline-fitted into a lower shaft 13a disposed on the front side so that torque can be transmitted and so that the relative displacement therebetween can be made in the axial direction, is rotatably supported inside the steering column 6b. The lower and upper shafts 13a and 14a are made of steel. A steering wheel 1 (see FIG. 10) is fixed to the rear end portion of the upper shaft 14a protruding from the rear end opening in the outer column 12a.

The housing 15a, in which a cover 32 on the front side and a main body 33 on the rear side, each made of a light alloy, such as an aluminum alloy, or a synthetic resin, are connected to each other using a plurality of bolts 34, is securely connected to the front end portion of the inner column 11a. The front end portion of the lower shaft 13a is inserted into the inside of the housing 15a.

The output shaft 16a is made of steel, a magnetic metal, and formed into a hollow shaft shape, and is rotatably supported by a pair of ball bearings 17a and 18a on the front side of the lower shaft 13a inside the housing 15a. A universal joint 7 (see FIG. 10) is connected to the front end portion of the output shaft 16a protruding from the front end opening of the housing 15a.

The torsion bar 19a is made of spring steel. The torsion bar 19a coaxially connects the lower shaft 13a (a rotation shaft and an example of an input shaft to which the steering force from the steering wheel is applied) and the output shaft 16a (a rotation shaft and an example of an output shaft to which the assisting force generated by the electric motor is applied) to each other. In the torsion bar 19a configured as described above, the most portion thereof, excluding the rear end portion thereof, is disposed radially inside the output shaft 16a, and the front end portion thereof is connected to the front end portion of the output shaft 16a using a pin 35 so as not to be relatively rotatable, and the rear end portion thereof is spline-fitted into the spline hole 36 provided at the center section in the radial direction at the portion near the front end of the lower shaft 13a so as not to be relatively rotatable.

A cylindrical portion 20a having a cylindrical shape is provided at the front end portion of the lower shaft 13a. On the inner peripheral surface of the cylindrical portion 20a, a female stopper portion 22a having a concave-convex shape (a gear-like shape) in the circumferential direction is provided, wherein the dimension of the inner diameter thereof (the diameter of the inscribed circle thereof) is larger than the diameter of the spline hole 36. In the female stopper portion 22a, axially extending teeth 37, 37 are provided at equal intervals in the circumferential direction on the inner peripheral surface of the cylindrical portion 20a.

On the other hand, at the rear end portion of the outer peripheral surface of the output shaft 16a, a male stopper portion 23a having a concave-convex shape (a gear-like shape) in the circumferential direction is provided, wherein the dimension of the outer diameter thereof (the diameter of the circumscribed circle thereof) is smaller than the diameter of the portion near the rear end. In the male stopper portion 23a, a plurality of axially extending grooves 38, 38 (the same number as the teeth 37, 37) are provided at equal intervals in the circumferential direction at the rear end portion of the outer peripheral surface of the output shaft 16a.

The female stopper portion 22a and the male stopper portion 23a configured as described above are in concave-convex engagement with each other so as to be relatively rotatable in a given angular range (for example, ±5 degrees from a neutral state in which the torsion bar 19a is not twisted). In other words, the teeth 37, 37 of the female stopper portion 22a are loosely engaged with the grooves 38, 38 of the male stopper portion 23a in a state in which a clearance is provided therebetween in the circumferential direction, whereby the relative rotation between the lower shaft 13a and the output shaft 16a is restricted in the given angular range. Hence, the torsion bar 19a is prevented from being twisted excessively.

A torque detection concave-convex portion 24a having a concave-convex shape along the circumferential direction is provided at the portion near the rear end of the outer peripheral surface of the output shaft 16a, the portion being adjacent to the male stopper portion 23a in the axial direction. As understood from the above description, the torque detection concave-convex portion 24a has an outside diameter dimension (the diameter of the circumscribed circle thereof) larger than that of the male stopper portion 23a. In the torque detection concave-convex portion 24a configured as described above, a plurality of grooves 39, 39 being long in the axial direction are provided at equal intervals in the circumferential direction at the portion near the rear end of the outer peripheral surface of the output shaft 16a. In the case of the structure shown in the figure, the quantity and the circumferential phase of the respective grooves 39, 39 coincide with those of the respective grooves 38, 38 of the male stopper portion 23a. In other words, the respective grooves 39, 39 and the respective grooves 38, 38 are provided continuously in a row in the axial direction.

The torque detection sleeve 25a, made of a non-magnetic metal having electrical conductivity, such as an aluminum alloy, is formed into a cylindrical shape and is disposed coaxially with and radially outside the torque detection concave-convex portion 24a. The base end portion (rear end portion) of the torque detection sleeve 25a is securely fitted on a cylindrical portion 20a. For this purpose, a plurality of axial grooves 40, 40 being long in the axial direction are provided at equal intervals in the circumferential direction on the outer peripheral surface of the cylindrical portion 20a. In addition, a circumferential groove 21a is provided in the circumferential direction around the entire circumference (excluding the portions where the respective axial grooves 40, 40 are provided) at the portion near the rear end of the outer peripheral surface of the cylindrical portion 20a. In particular, in the case of the structure shown in the figure, the circumferential groove 21a is disposed at the position radially overlapping the portion near the rear end of the stopper engagement region in which the female stopper portion 22a and the male stopper portion 23a are engaged with each other. On the other hand, a plurality (as many as the axial grooves 40, 40) of hemispherical protrusions 41, 41 are provided at equal intervals in the circumferential direction on the inner peripheral surface of the base end portion of the torque detection sleeve 25a.

In the case that the base end portion of the torque detection sleeve 25a is securely fitted on the cylindrical portion 20a, the protrusions 41, 41 are engaged with the axial grooves 40, 40 as the base end portion of the torque detection sleeve 25a is securely fitted on the cylindrical portion 20a. At the same time, the edge portion of the base end portion of the torque detection sleeve 25a is clinched to the circumferential groove 21a. In other words, the edge portion of the base end portion is plastically deformed to form a clinch portion 42, and at the same time, the clinch portion 42 is engaged with the circumferential groove 21a. As a result, on the basis of the engagement of the respective axial grooves 40, 40 and the respective protrusions 41, 41, the torque detection sleeve 25a is prevented from rotating with respect to the cylindrical portion 20a. In addition, on the basis of the engagement of the circumferential groove 21a with the clinch portion 42, the torque detection sleeve 25a is positioned in the axial direction and is prevented from being displaced with respect to the cylindrical portion 20a.

In the range from the distal end section (the front end portion) to the intermediate section of the torque detection sleeve 25a, serving as the portion disposed radially outside the torque detection concave-convex portion 24a, a plurality of window holes 26a, 26a having a nearly rectangular shape are provided at equal intervals in the circumferential direction in double rows in the axial direction. The circumferential phases of the window holes 26a, 26a in the double rows deviate from each other by a half pitch.

The torque detection coil unit 27a is formed into a cylindrical shape and disposed coaxially with and radially outside the torque detection concave-convex portion 24a and the torque detection sleeve 25a. The torque detection coil unit 27a is securely fitted in the housing 15a, and includes a pair of coils 43, 43. The coils 43, 43 are disposed so as to radially overlap the portion of the torque detection sleeve 25a on which the window holes 26a, 26a in the double rows are provided.

The board 44 is disposed below the torque detection coil unit 27a inside the housing 15a. A motor control circuit is configured on the board 44. The end sections of the coils 43, 43 are connected to this motor control circuit.

The worm reducer 30a is a combination of a worm wheel 28a and a worm, not shown. The worm wheel 28a is securely fitted on the axial center section of the output shaft 16a between the ball bearings 17a and 18a. The worm, not shown, is rotatably supported inside the housing 15a in a state of being engaged with the worm wheel 28a.

The electric motor 10 (see FIG. 10) is supported by and fixed to the housing 15a. The output shaft of the electric motor 10 is connected to the base end portion of the worm, not shown, so that torque can be transmitted.

In the portion between the outer peripheral surface of the base end portion of the torque detection sleeve 25a and the inner face of the housing 15a, a seal ring 45 for preventing the lubricant inside the housing 15a from leaking into the space radially inside the steering column 6b is provided. While the seal ring 45 is provided such that it is securely fitted on the base end portion of the torque detection sleeve 25a, the forked distal end thereof is made slide contact with a cylindrical inner peripheral surface 46 and a step surface 47 directed forward (opposed to the rear end portion of the seal ring 45 in the axial direction) around the whole circumference, the inner peripheral surface 46 and the step surface 47 being provided in a state of being adjacent to each other.

In the case of the electric power steering apparatus configured as described above, when torque serving as a steering force is applied to the steering shaft 5b by the operation of the steering wheel 1 by the driver, the torsion bar 19a is elastically twisted (in the given angular range) by the amount corresponding to the direction and magnitude of this torque. Accordingly, the positional relationship between the torque detection concave-convex portion 24a and the torque detection sleeve 25a in the circumferential direction is changed, whereby the impedances of the coils 43, 43 of the torque detection coil unit 27 are changed. Hence, on the basis of the changes in impedance, the direction and magnitude of the torque can be detected. The motor control circuit on the board 44 performs energizing control for the electric motor 10 by using the detection result of the torque and generates assisting force corresponding to the direction and magnitude of the torque. This assisting force is increased by the worm reducer 30a and then applied to the output shaft 16a. As a result, the force required for the driver to operate the steering wheel 1 is reduced.

On the other hand, when the twisted amount of the torsion bar 19a reaches the upper limit value on one side or on the other side of the given angular range due to the input of large torque from the steering wheel 1 to the steering shaft 5b, the female stopper portion 22a is engaged with the male stopper portion 23a in the circumferential direction. Hence, on the basis of this engagement, part of the torque is directly transmitted from the lower shaft 13a to the output shaft 16a. At this time, the cylindrical portion 20a is liable to be twisted as the torque is transmitted.

In the case of the electric power steering apparatus according to this embodiment configured as described above, the portion of the cylindrical portion 20a provided with the circumferential groove 21a on the outer peripheral surface thereof, being lower in torsion rigidity than the other axial portions, radially overlaps the stopper engagement region in which the female stopper portion 22a and the male stopper portion 23a are engaged with each other. Hence, when part of the torque is directly transmitted between the lower shaft 13a and the output shaft 16a via the stopper engagement region in which the female stopper portion 22a and the male stopper portion 23a are engaged with each other, the rear end portion of the output shaft provided with the male stopper portion 23a serves as a reinforcement member, whereby the torsion rigidity of the portion of the cylindrical portion 20a provided with the circumferential groove 21a on the outer peripheral surface thereof can be improved.

Figure 1:
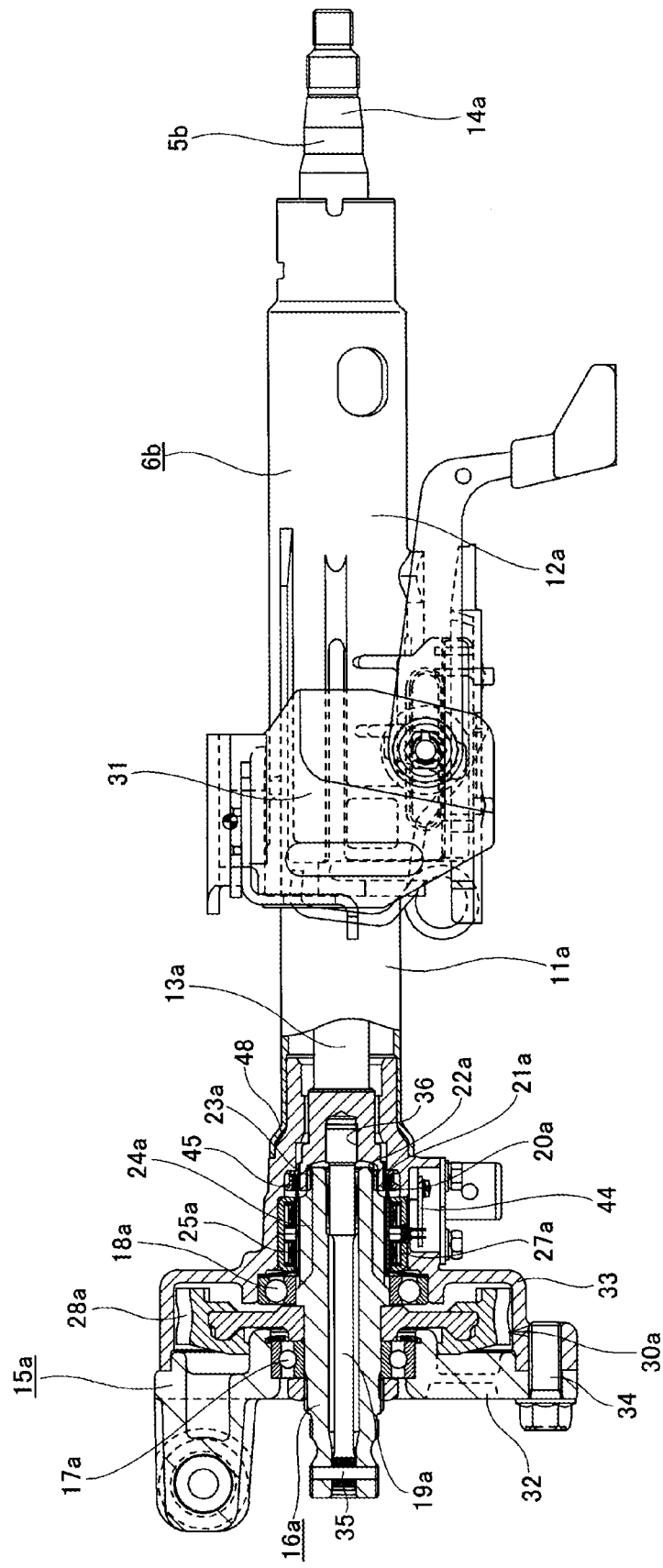
FIG. 1 is a partially cut-away side view of an electric power steering apparatus according to a first embodiment of the present invention.
Figure 2:
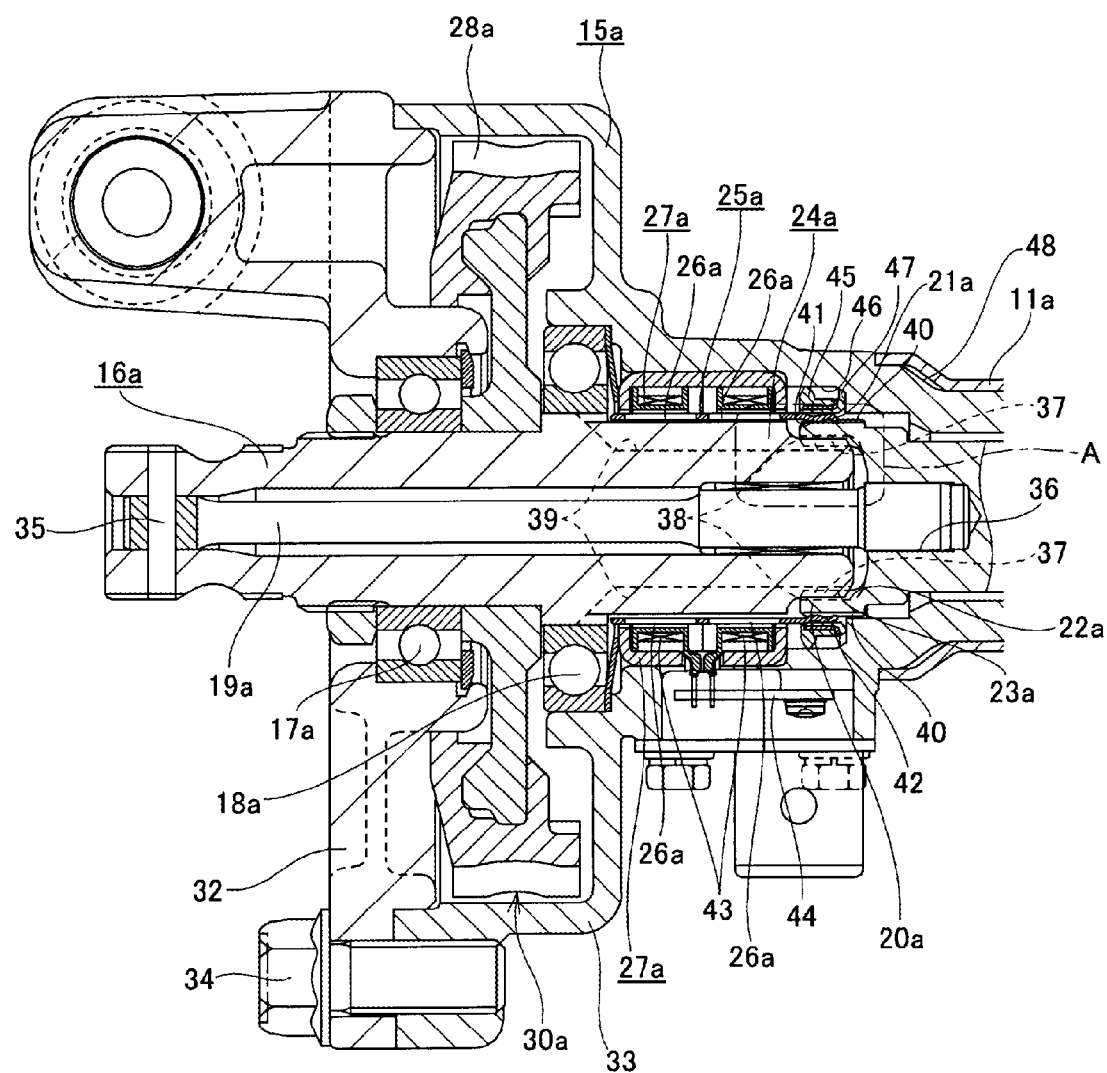
FIG. 2 is an enlarged view of the left end section of the electric power steering apparatus shown in FIG. 1.
Figure 3:
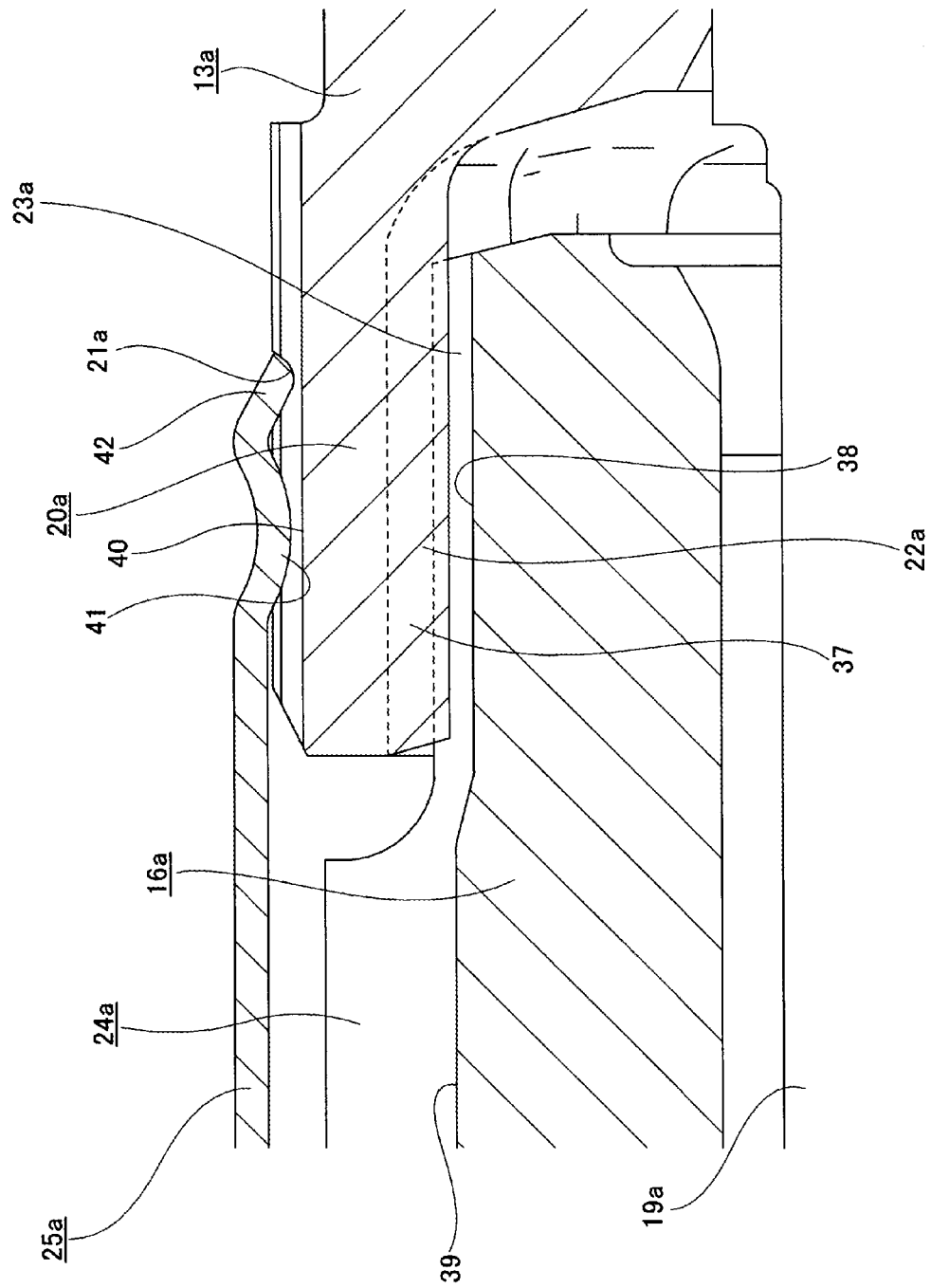
FIG. 3 is an enlarged view of the section A in FIG. 2, partially omitted.
Figure 4:
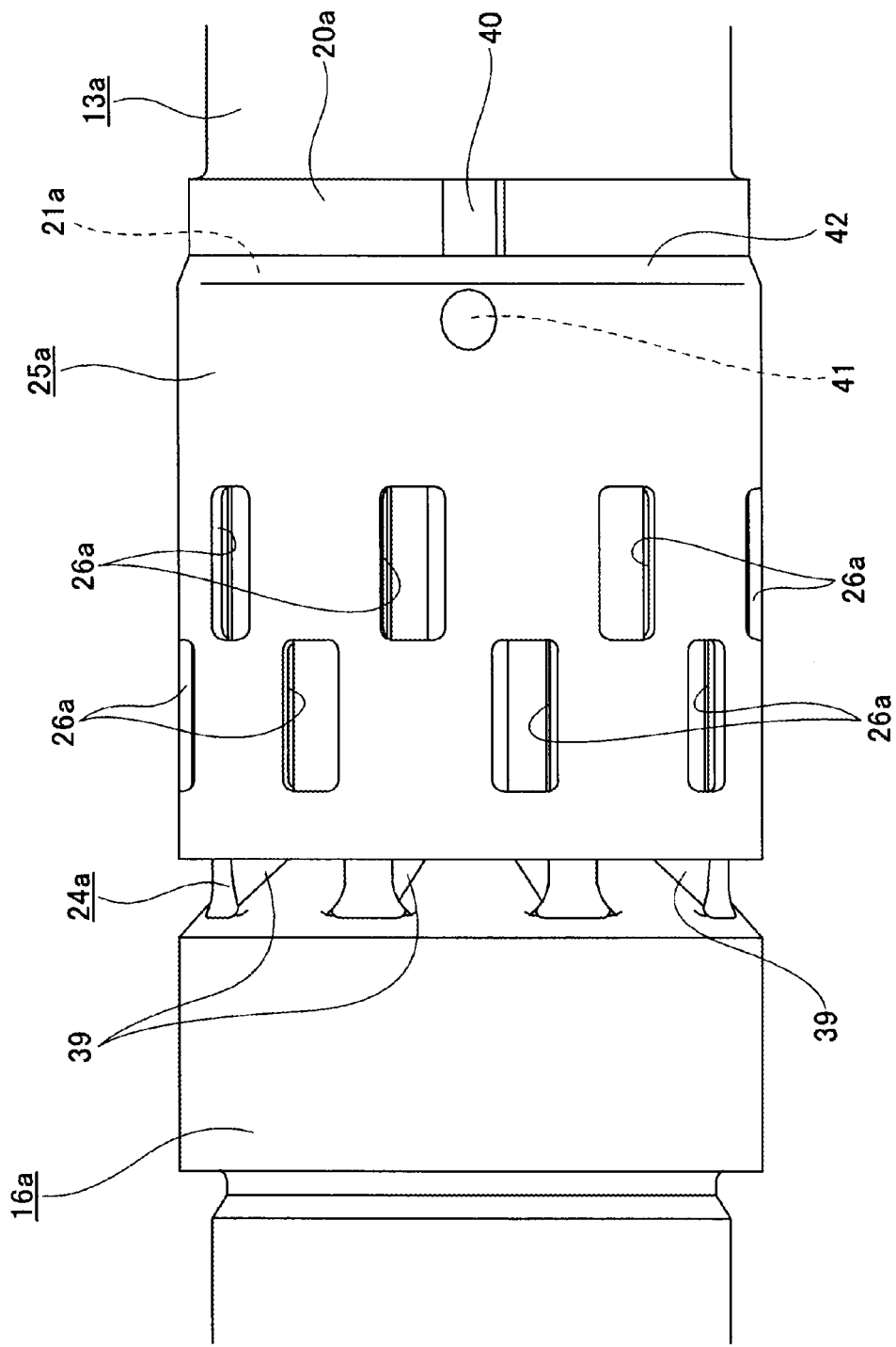
FIG. 4 is a view of a torque detection sleeve and its peripheral portion observed from a radially outside.
Figure 5:
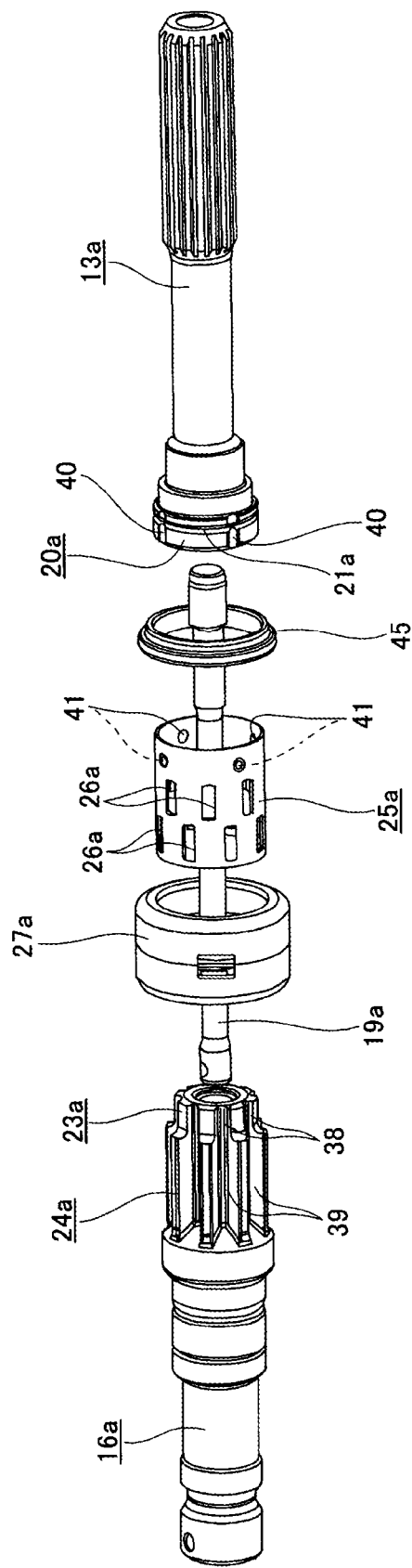
FIG. 5 is an exploded perspective view of a torque detection section.
Figure 6:
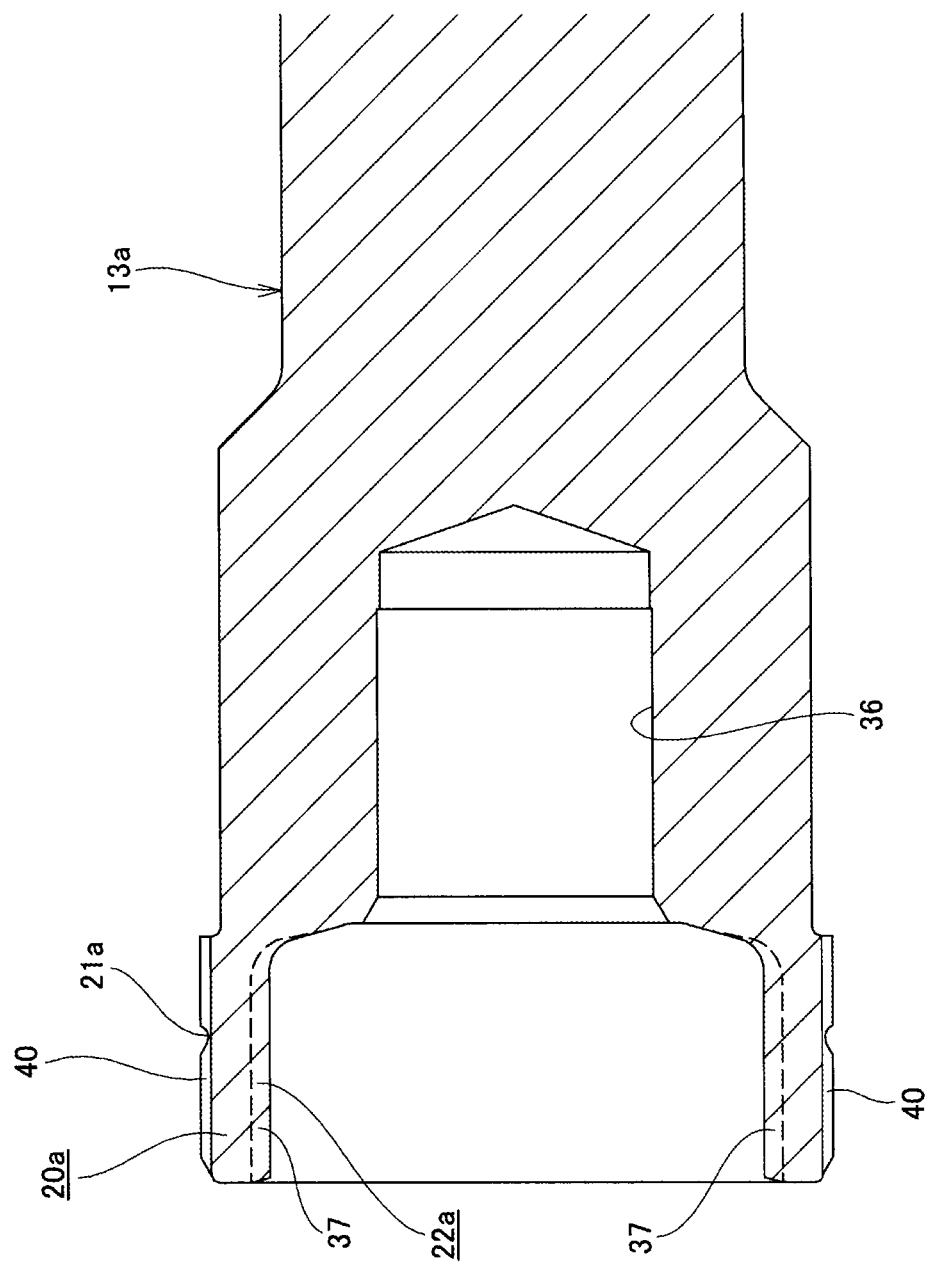
FIG. 6 is an enlarged sectional view of a front end portion of a lower shaft (an example of an input shaft).
Figure 7:
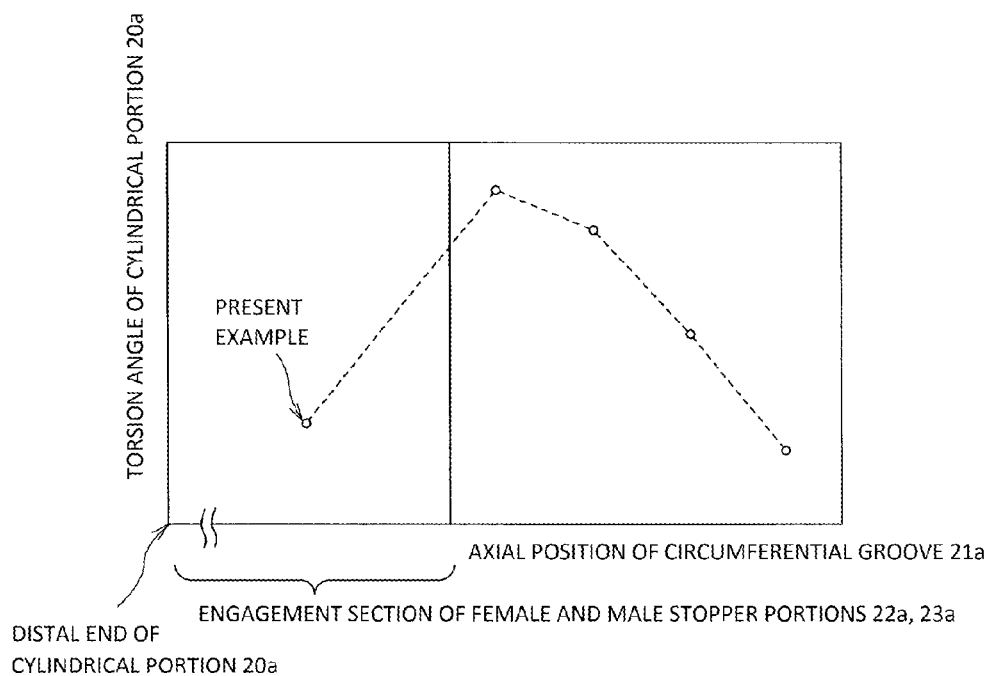
FIG. 7 is a diagram showing a relationship between an axial position of a circumferential groove (horizontal axis) and a torsion angle from the base end to the distal end of a cylindrical portion (vertical axis).

The diagram of FIG. 7 indicates, in the case that the axial position (represented in the horizontal axis) of the circumferential groove 21a provided on the outer peripheral surface of the cylindrical portion 20a is changed, how the torsion angle (represented in the vertical axis) in the range of the base end to the distal end of the cylindrical portion 20a is changed in the case that the same torque is transmitted. In the diagram, the first data (point) from the left is data related to the structure of this embodiment. As indicated by this data, in the case of this embodiment, the torsion rigidity of the portion of the cylindrical portion 20a provided with the circumferential groove 21a on the outer peripheral surface thereof can be improved by the rear end portion of the output shaft provided with the male stopper portion 23a, whereby the torsion angle from the base end to the distal end of the cylindrical portion 20a can be suppressed sufficiently. Hence, when the respective components for torque detection and the peripheral portions thereof are made smaller in diameter and lighter in weight, the cylindrical portion 20a can easily be made smaller in thickness by the amount of the improvement.

In the diagram of FIG. 7, the first data from the right is data related to the structure in which the circumferential groove 21a is provided at the edge portion of the base end portion on the outer peripheral surface of the cylindrical portion 20a. The reason why the torsion angle becomes small in the case of this structure is that the inner diameter dimension of the cylindrical portion 20a is made smaller as proceeding to the base end side at the portion near the base end of the cylindrical portion 20a, and accordingly, the thickness of the cylindrical portion 20a in the radial direction is made larger as proceeding to the base end side. In the diagram of FIG. 7, the reason why the torsion angle becomes relatively small in the case of the structure (the structure provided with the circumferential groove 21a at the portion near the base end of the outer peripheral surface of the cylindrical portion 20a) related to the second data from the right is similar to the reason described above.

Hence, it is conceived to improve torsion rigidity by adopting a structure in which the circumferential groove 21a is provided at the edge portion of the base end portion of the outer peripheral surface of the cylindrical portion 20a or the portion near the base end, instead of adopting the structure according to this embodiment. However, in the case that this kind of structure is adopted, the fitting length of the base end portion of the torque detection sleeve 25a with respect to the cylindrical portion 20a becomes larger, whereby the axial dimension of the torque detection sleeve 25a becomes larger by the amount of the increased length. As a result, the material cost of the torque detection sleeve 25a increases.

On the other hand, in the case of this embodiment, the circumferential groove 21a is provided at the portion of the outer peripheral surface of the cylindrical portion 20a that is radially overlapping the stopper engagement region in which the female stopper portion 22a and the male stopper portion 23a are engaged with each other. Hence, the fitting length of the base end portion of the torque detection sleeve 25a with respect to the cylindrical portion 20a can be made smaller than that in the case in which the circumferential groove 21a is provided at the portion (the rear side portion from the engagement region in the axial direction) not overlapping the engagement region. Therefore, the axial dimension of the torque detection sleeve 25a can be made smaller by the amount of the decreased length. As a result, the material cost of the torque detection sleeve 25a can be reduced.

Furthermore, in the case of this embodiment, the axial position of the step surface 47 with which the seal ring 45 securely fitted on the base end portion of the torque detection sleeve 25a is made slide contact can be disposed further on the front side than the position in the case that the circumferential groove 21a is provided at the portion not overlapping the engagement region. Hence, by the amount, the column support surface 48 of the housing 15a provided behind the step surface 47 can be disposed further on the front side. The column support surface 48 is a face with which the front end edge of the outer column 12a having moved forward along the inner column 11a is collided at the time of a secondary collision (via the front end portion of the inner column 11a in the case of the structure shown in the figure), and as the face is positioned further on the front side, the forward movement amount (the impact absorption stroke at the time of the secondary collision) of the outer column 12a becomes longer, whereby the protection of the driver can be enhanced. Hence, in the case of this embodiment, the impact absorption stroke is made longer by the amount of the length in which the column support surface 48 is disposed further on the front side as described above, whereby the protection of the driver can be enhanced.

Furthermore, in the case that the structure according to this embodiment is embodied, the outer diameter dimension of the outer peripheral surface of the cylindrical portion 20a from the base end to the portion near the circumferential groove 21a in the axial direction can be made smaller than that in the case shown in the figure. Since the degree of freedom of the shape of the rear end portion of the housing 15a is increased by adopting this kind of configuration, design for making the above-mentioned impact absorption stroke longer can be made easily.

Figure 8:
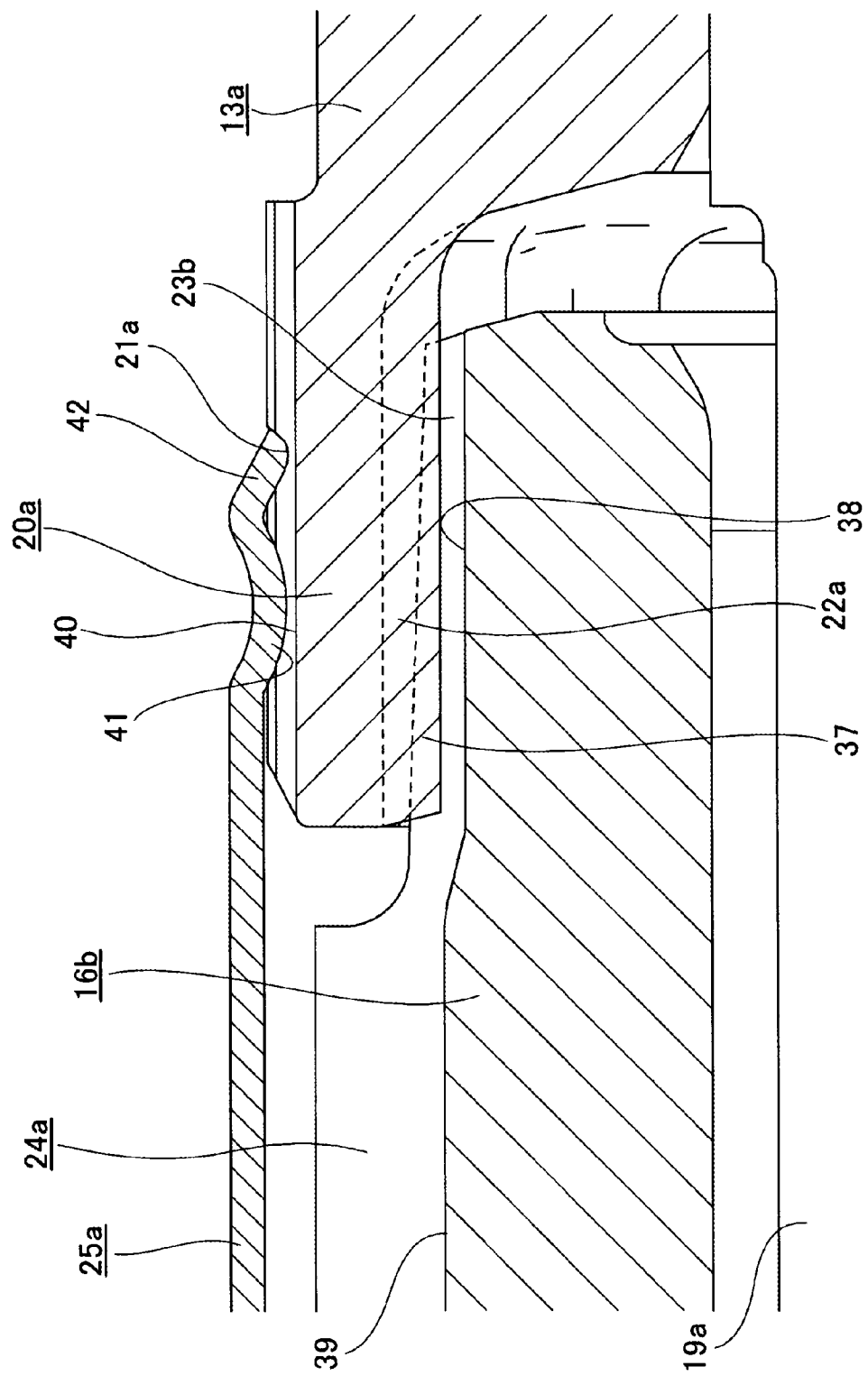
FIG. 8 is an enlarged view of a structure according to a second embodiment of the present invention.

FIG. 8 shows a second embodiment according to the present invention. In the case of this embodiment, the diameter of the inscribed circle of the female stopper portion 22a is made constant along the axial direction, and the diameter of the circumscribed circle of a male stopper portion 23b is made to decrease from the distal end toward the base end of the cylindrical portion 20a in the axial direction (from the base end toward the distal end of the male stopper portion 23b). With this configuration, the radial engagement amount between the female stopper portion 22a and the male stopper portion 23b i (the radial engagement height or engagement amount with the female and male stopper portions 22a and 23b being engaged with each other along the circumferential direction) decreases from the distal end toward the base end of the cylindrical portion 20a.

In the case of the electric power steering apparatus according to this embodiment in which the above-mentioned configuration is adopted, at the time when part of the torque is directly transmitted between the lower shaft 13a and the output shaft 16a via the stopper engagement region in which the female stopper portion 22a and the male stopper portion 23b are engaged with each other, the stress distribution at the portion of the cylindrical portion 20a provided with the circumferential groove 21a on the outer peripheral surface thereof can be suppressed lower than the stress distribution at the portion closer to the distal end. Hence, when the respective components for torque detection and the peripheral portions thereof are made smaller in diameter and lighter in weight, the cylindrical portion 20a can easily be made further smaller in thickness by the amount of the suppression. Since the other configurations and actions are similar to those in the case of the first embodiment described above, overlapped illustrations and descriptions are omitted.

Figure 9:
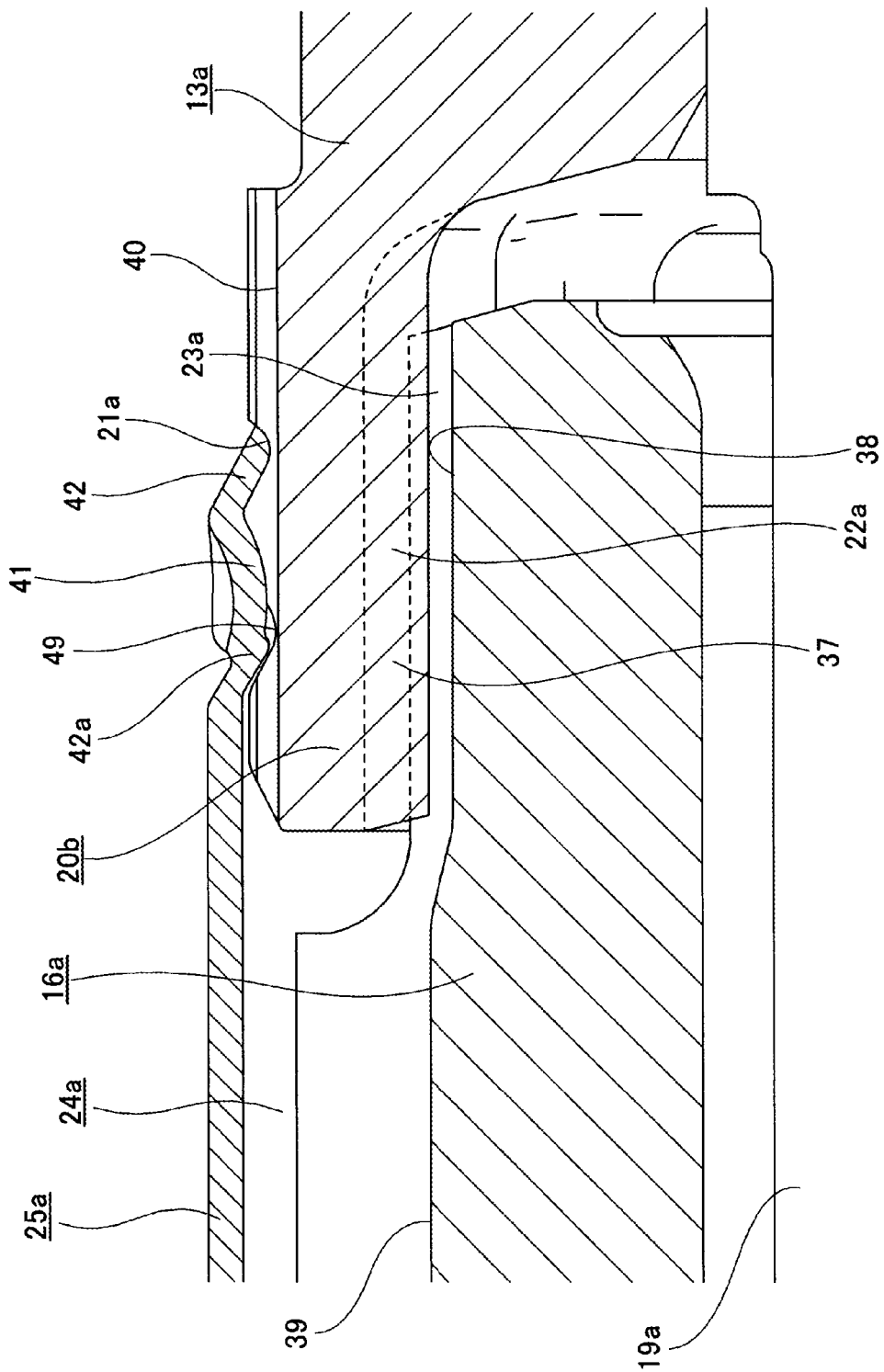
FIG. 9 is an enlarged view of a structure according to a third embodiment of the present invention.

FIG. 9 shows a third embodiment according to the present invention. In the case of this embodiment, an auxiliary circumferential groove 49 is provided around the entire circumference in the circumferential direction at the portion on the outer peripheral surface of the cylindrical portion 20b radially overlapping the engagement region of the female stopper portion 22a and the male stopper portion 23a and at the position between the circumferential groove 21a and the distal end of the cylindrical portion 20b. Furthermore, a part of the base end portion of a torque detection sleeve 25b in the axial direction is clinched to the auxiliary circumferential groove 49. In other words, this part in the axial direction is plastically deformed radially inward to form a clinched portion 42a, and at the same time, the clinch portion 42a is engaged with the auxiliary circumferential groove 49. With this configuration, the connection strength of the base end portion of the torque detection sleeve 25b to the cylindrical portion 20b is enhanced. Since the other configurations and actions are similar to those in the case of the first embodiment described above, overlapped illustrations and descriptions are omitted. The auxiliary circumferential groove 49 and the clinch portion 42a can also be provided for the structure according to the second embodiment described above.

INDUSTRIAL APPLICABILITY

In the above-mentioned respective embodiments, the present invention is applied to the structure wherein the output shaft to which the assisting force is applied is connected to the lower shaft (input shaft) of the steering shaft. However, the present invention can also be applied to a structure wherein the output shaft to which the assisting force is applied is connected to the input shaft of the steering gear unit. The present invention can also be applied to a structure wherein the output shaft is provided with a female stopper portion and a cylindrical portion having a circumferential groove and the input shaft is provided with a male stopper portion and a torque detection concave-convex portion, for example, as in the above-mentioned conventional structure. With the radial engagement amount of the female stopper portion and the male stopper portion decreasing from the distal end toward the base end of the cylindrical portion, it is possible to adopt a configuration in which, in a region where the female stopper portion and the male stopper portion engage with each other, the diameter of the circumscribed circle of the male stopper portion is constant along the axial direction, and the diameter of the inscribed circle of the female stopper portion increases along the axial direction from the distal end toward the base end of the cylindrical portion. In the case that the present invention is embodied and in the case that the axial grooves are provided on the outer peripheral surface of the cylindrical portion as in the above-mentioned respective embodiments, the depths of the circumferential groove and the auxiliary circumferential groove may be made equal to the depth of the axial grooves or may be made smaller or larger than the depth of the axial grooves.

The present application is based on Japanese Patent Application JP 2013-121876 filed on Jun. 10, 2013, the content of which is incorporated herein by reference.

DESCRIPTION OF REFERENCE SIGNS 1 steering wheel
2 steering gear unit
3 input shaft
4 tie rod
5, 5a, 5b steering shaft
6, 6a, 6b steering column
7 universal joint
8 intermediate shaft
9 universal joint
10 electric motor
11, 11a inner column
12, 12a outer column
13, 13a lower shaft
14, 14a upper shaft
15, 15a housing
16, 16a, 16b output shaft
17, 17a ball bearing
18, 18a ball bearing 19, 19a torsion bar
20, 20a, 20b cylindrical portion
21, 21a circumferential groove
22, 22a female stopper portion
23, 23a, 23b male stopper portion
24, 24a torque detection concave-convex portion
25, 25a, 25b torque detection sleeve
26, 26a window hole
27, 27a torque detection coil unit
28, 28a worm wheel
29 worm
30, 30a worm reducer
31 support bracket
32 cover
33 main body
34 bolt
35 pin
36 spline hole
37 tooth
38 groove
39 groove
40 axial groove
41 protrusion
42, 42a clinch portion
43 coil
44 board
45 seal ring
46 inner peripheral surface
47 step surface
48 column support surface
49 auxiliary circumferential groove

The invention claimed is:

1. An electric power steering apparatus comprising:
an input shaft to which steering force is applied from a steering wheel;
an output shaft to which assisting force generated by an electric motor is applied;
a torsion bar provided radially inside the input shaft and the output shaft in a state in which the input shaft and the output shaft are coaxially connected to each other; and
a torque detection sleeve,
wherein one of the input shaft and the output shaft comprises a cylindrical portion, the cylindrical portion being provided at an end section of the one of the input shaft and the output shaft that is connected to the other of the input shaft and the output shaft,
wherein the cylindrical portion comprises a female stopper portion having a concave-convex shape along a circumferential direction and provided on an inner peripheral surface of the cylindrical portion, a circumferential groove provided along the circumferential direction on an outer peripheral surface of the cylindrical portion,
wherein the other of the input shaft and the output shaft comprises a male stopper portion having a concave-convex shape along the circumferential direction and provided on an outer peripheral surface of an end section of the other of the input shaft and the output shaft that is connected to the one of the input shaft and the output shaft, the male stopper portion being in concave-convex engagement with the female stopper portion so as to be relatively rotatable in a given angular range, and a torque detection concave-convex portion having a concave-convex shape along the circumferential direction and provided on a portion of an outer peripheral surface of the other of the input shaft and the output shaft that is adjacent to the male stopper portion in the axial direction,
wherein the torque detection sleeve is disposed radially outside the torque detection concave-convex portion,
wherein a base end portion of the torque detection sleeve is securely fitted on the cylindrical portion in a state in which an edge portion of the base end portion is clinched to the circumferential groove, and
wherein the circumferential groove is provided on a portion of the outer peripheral surface that radially overlaps a stopper engagement region,
wherein the stopper engagement region is defined as the region in which the female stopper portion and the male stopper portion engage and contact each other, wherein the male stopper portion serves as a reinforcement member to increase a torsion rigidity of the portion of the cylindrical portion provided with the circumferential groove.

2. The electric power steering apparatus according to claim 1, wherein a radial engagement amount between the female stopper portion and the male stopper portion decreases from a distal end toward a base end of the cylindrical portion.

3. The electric power steering apparatus according to claim 2, wherein, in the stopper engagement region, a diameter of an inscribed circle of the female stopper portion is constant along the axial direction, and a diameter of a circumscribed circle of the male stopper portion decreases along the axial direction from the distal end toward the base end of the cylindrical portion.

4. The electric power steering apparatus according to claim 1, wherein an auxiliary circumferential groove is provided along the circumferential direction on the portion on the outer peripheral surface of the cylindrical portion radially overlapping the stopper engagement region and at a location between the circumferential groove and a distal end of the cylindrical portion, and
wherein a portion of the base end portion of the torque detection sleeve is clinched to the auxiliary circumferential groove.

5. The electric power steering apparatus according to claim 1, comprising a steering column, a steering shaft and a housing,
wherein the steering column comprises an inner column and an outer column, a front portion of the outer column being fitted onto a rear portion of the inner column so as to allow a relative displacement in the axial direction,
wherein the steering shaft comprising the input shaft and an upper shaft, and a front portion of the upper shaft being fitted to a rear portion of the input shaft so as to allow a torque transmission and a relative displacement in the axial direction,
wherein the steering shaft is rotatably supported inside the steering column, the steering wheel being fixed to a rear end portion of the upper shaft that protrudes from a rear end opening of the steering column,
wherein the housing rotatably supports the output shaft inside the housing in a state in which the housing is securely connected to a front end portion of the inner column,
wherein the end section of the input shaft and the end section and an intermediate section of the output shaft are disposed inside the housing, and
wherein the one of the input shaft and the output shaft is the input shaft, and the other of the input shaft and the output shaft is the output shaft.

* * * * *